United States Patent [19]

Korff et al.

[11] 4,059,379
[45] Nov. 22, 1977

[54] METHOD OF BELLING PLASTIC PIPE AND APPARATUS THEREFOR

[75] Inventors: Wolfram G. Korff; Vernon V. Emery, both of Granada Hills; Joseph Kim Bond, North Hollywood; Joseph Marcella, Granada Hills, all of Calif.

[73] Assignee: Emery Company, Inc., Pacoima, Calif.

[21] Appl. No.: 717,874

[22] Filed: Aug. 26, 1976

[51] Int. Cl.² ............................................ B29C 17/00
[52] U.S. Cl. ..................................... 425/393; 264/322
[58] Field of Search ...... 425/384, 393, 397, DIG. 118; 264/95, 94, 322, 295, 296, 294

[56] References Cited

U.S. PATENT DOCUMENTS

| | | | |
|---|---|---|---|
| 3,205,535 | 9/1965 | Niessner et al. | 425/393 X |
| 3,360,826 | 1/1968 | Lorang | 425/392 |
| 3,553,780 | 1/1971 | Kuhlemann | 425/393 X |
| 3,672,804 | 6/1972 | Dalik | 425/393 X |
| 3,849,052 | 11/1974 | Gordon | 425/393 X |
| 3,893,794 | 7/1975 | Acda | 425/393 |
| 3,910,744 | 10/1975 | Ronden et al. | 425/393 X |
| 3,932,094 | 1/1976 | Korff et al. | 425/393 |

*Primary Examiner*—Robert L. Spicer, Jr.
*Attorney, Agent, or Firm*—William H. Pavitt, Jr.

[57] ABSTRACT

Plastic pipe is belled under pressure by inserting what is, in effect, a telescoping mandrel into a heat-softened pipe end with great axial force immediately after two mold halves with cavities defining the desired bell configurations have been brought together under pressure. The softened pipe end is not only expanded to a bell configuration by the mandrel, but is compressed by the radial annular end wall of a sleeve which slides axially over the mandrel into the spacing between the mandrel and the mold halves defining the bell-shaped cavity. Thereby, not only may the heat-softened pipe end be molded to assume an exact configuration to a high degree of tolerance, but the normal thinning of the walls of the pipe end which occurs with its belling may be re-thickened by the axial compression of the sleeve to the original pipe wall thickness. After such radial expansion and axial compression of the heat-softened pipe end to the precise bell shape and tolerance, the mold halves are first cooled, the sleeve is first withdrawn axially, then the mandrel is withdrawn, and lastly the mold halves are separated to permit the belled pipe to be removed.

Apparatus is provided to accomplish this process by bringing the mold halves together under great pressure followed by the axial movement into the pipe end of the mandrel and its axially compressing sleeve.

18 Claims, 11 Drawing Figures

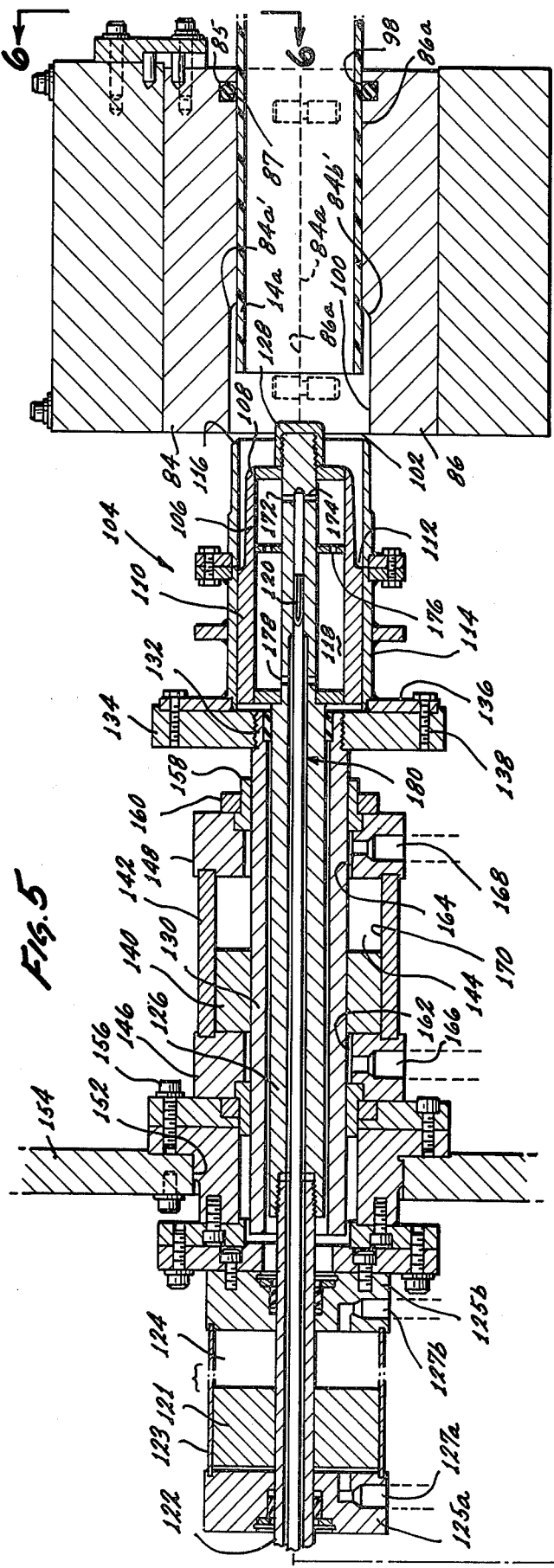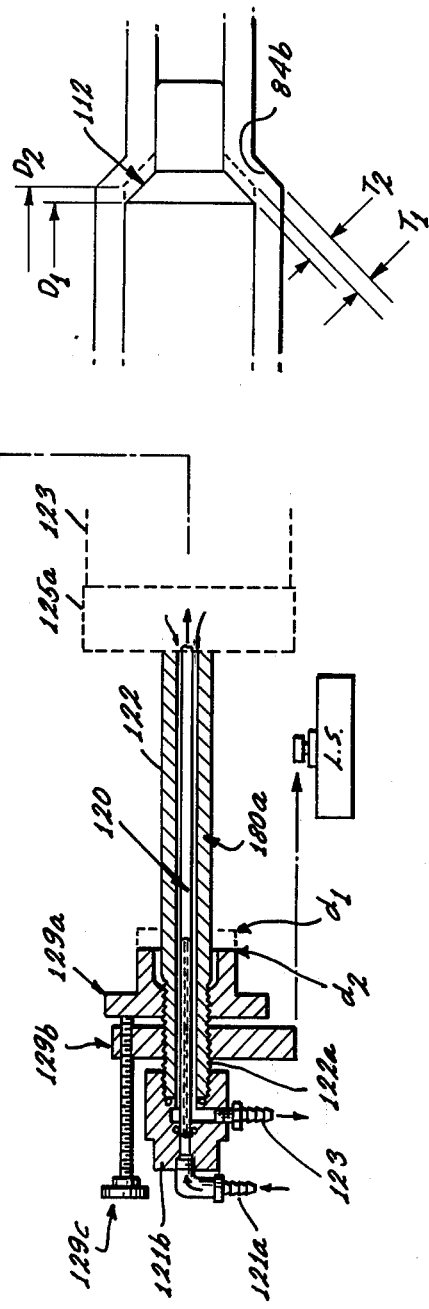

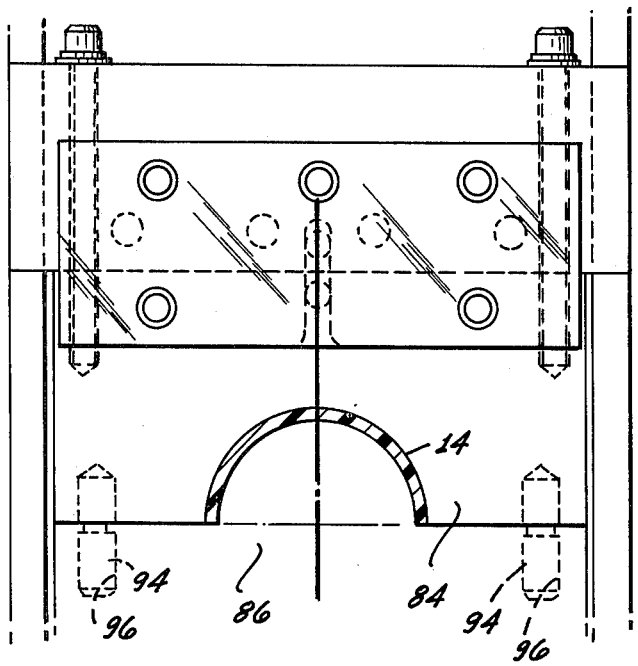
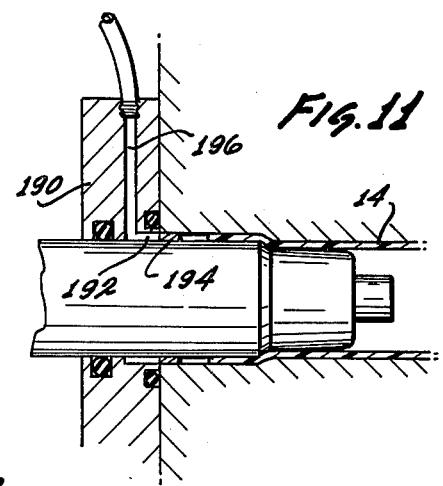
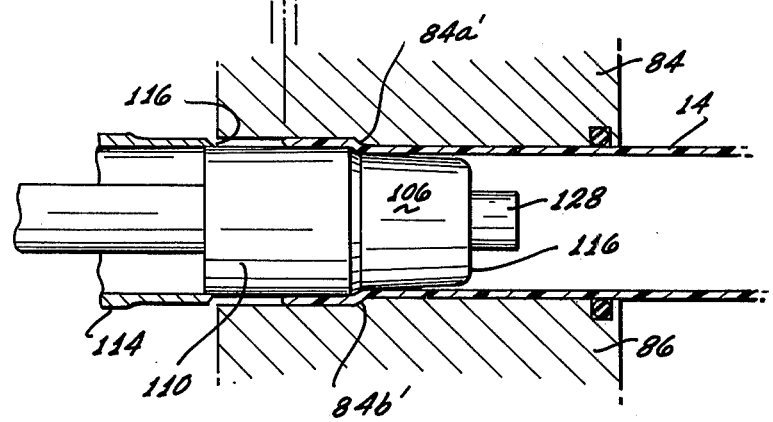
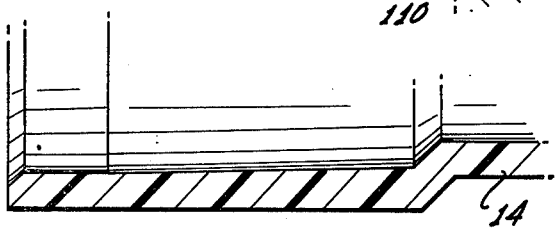
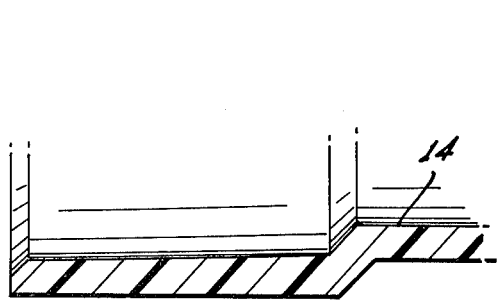

METHOD OF BELLING PLASTIC PIPE AND APPARATUS THEREFOR

BACKGROUND OF THE INVENTION

I. Field of the Invention

This invention relates to methods and apparatus for belling plastic pipe used as conduits for fluids and electrical wiring.

II. Description of the Prior Art

Ever since the development of processes for extruding rigid thermo-plastic piping which is cut into lengths suitable for handling, shipping to an installation site where it is joined end to end with other pipelengths for use as a conduit for fluids and cables or other types of wiring, it has been the practice in the art to bell at least one end of a pipe section to provide such an increase in diameter for a short length of the end of the pipe section as to enable it to receive the unbelled end of another pipe section in a close fit. To accomplish such belling, a number of different types of apparatus operating in accordance with different methods have been devised, as exemplified by the teachings of the following patents:

| NAME | NUMBER |
|------|--------|
| Niessner | 3,205,535 |
| Kuhlemann | 3,557,278 |
| Dalik | 3,672,804 |
| Osterhagen | 3,806,301 |
| Barnett | 3,861,847 |
| Ronden | 3,910,744 |
| Emery | 3,923,443 |
| Emery | 3,932,094 |

While the apparatus and methods taught by each of the foregoing patents, as well as in other patents, or otherwise sold or used in the industry may be satisfactory for accomplishing their particular objective or objectives, there has always existed with plastic pipes, no matter by what method or apparatus of the prior art it has been belled, an annular interruption or gap where the end of the inserted pipe end seats inside a belled pipe end. In many applications the existence of such interruption or gap poses no real problem, as, for example, where the inside diameter of the pipe may be quite large and it is intended to carry a relatively slow-moving fluid and some fluid leakage may be tolerated. However, in situations where the pipe walls may be thick in order to accommodate fluid under high pressure, where the inside diameter of the pipe may be relatively small and the velocity of the fluid passing through the pipe may be high, where no leakage may be tolerated through the pipe joint, or where wires may be pushed through the joined pipes to be pulled out at the other end, the existence of such interruptions or annular gaps at the annulars where the inserted pipe end abuts the widened wall of the belled pipe end, may present special problems to the installer and/or user of said plastic piping. Moreover, recently published specifications of the Underwriters Laboratories for belled plastic pipe intended to carry electrical cables for wiring, have specified such close tolerances with respect to both the belling angle as well as the axial width of the annular gap that most plastic piping belled by prior art methods and apparatus may be found to be incapable of meeting such Underwriters Laboratory specifications.

Another problem with prior art belling methods is that whenever a cylindrical pipe end, after heating, is forced outwardly to assume the belled configuration, necessarily the distension of the cylindrical walls results in their thinning where the radial expansion takes place. While in some situations the thinning of the pipe walls in the belled area may not be objectionable, there are other applications for belled pipe, as for example, where the piping is intended to carry fluid under extremely high pressure, that any thinning of the pipe walls may become quite unacceptable. In anticipation of such wall thinning through the belling process, some piping extruders have provided specially thickened annular areas in the piping as it is extruded. However, where this is done, it becomes necessary for the pipe to be cut only at such thickened areas. Thereby, the lengths of the pipe which may be produced are limited to the settings of the extruder as it produces such thickened areas in the piping emanating from it.

There has thus resulted a considerable need in the plastic piping industry to devise a method and apparatus for belling plastic pipe to more defined configurations and to much closer tolerances than have been heretofore obtainable by prior art methods and apparatus.

There has also existed a need for a method and apparatus to bell piping in such a manner that the resulting walls of the belled end of the pipe are not objectionably thinned, as has heretofore been the case, so that, as hereinbefore explained, it has been necessary to compensate for such thinning by having the extruder produce annular thickened areas of the pipe.

SUMMARY OF THE PRESENT INVENTION

The present invention enables piping to be belled to very exact configurations and to much closer tolerances than has heretofore been obtainable by any method or apparatus of the prior art. Essentially, the novel method of the present invention involves subjecting the heat-softened end of the pipe to disposition in an open-ended mold; next forcing this pipe end radially outwardly into the belled configuration of the mold by axially inserting into the pipe end a heated mandrel having an outer configuration similar to the mold walls, but spaced therefrom by a distance equal to the desired thickness of the pipe wall; and then bringing axially into the open-ended mold along the mandrel a sleeve-like compressing ram against the end of the pipe. Thereby, the heat-softened pipe end is compressed into the spacing between the mode walls and the mandrel to assume the exact configuration resulting of such spacing. Since such spacing may be made equal to the original wall thickness of the piping, the walls of the belled pipe end will thereby re-assume the thickness which they had before belling, although they will be shorter by the amount of plastic material which is required to re-thicken the distended walls through the axial compression of the sleeve-like ram.

As soon as such compression has been effected, the pipe end is cooled. Such cooling may be accomplished by passing fluid through the mold halves and/or even within the mandrel itself. After the pipe end is sufficiently cooled to retain its thus-compressed configuration, the sleeve-like ram is first retracted; the mandrel itself is withdrawn; and finally the mold halves are separated and the pipe is ejected from its belling position.

Piping belled according to the method of the present invention will be found not only to have the exact configuration of the spacing between the mold and the mandrel, but it will retain such configuration for the useful length of the life of the pipe. Such compression belling vitiates the memory of the plastic which might tend otherwise to cause the belled end of the pipe to try to reassume its original unbelled cylindrical shaping.

In order to enable plastic piping to be belled according to the present method, the apparatus of the present invention has been developed to first receive the plastic pipe; next to move the pipe transversely in such a manner that the end of the pipe which is to be belled, is rotatingly passed through an oven for heat-softening of that end; the pipe is then moved into a position where it can be raised for coaxial alignment with the mandrel with the heat-softened end disposed between two mold halves. The apparatus then closes the mold halves about the heat-softened pipe end, following which the mandrel is first inserted into the pipe end and thereafter a sleeve-like axial ram follows the movement of the mandrel to provide the axial compression desired for the pipe end.

The mandrel itself includes a leading cylindrical section having an outside diameter just sufficiently less than the inside diameter of the plastic pipe so as, in effect, to maintain the pipe diameter in annular area which is not to be belled but which is adjacent the end which is to be belled.

Correspondingly, the mold halves each have a first portion which defines half of a cylinder of a diameter equal to the outside diameter of the pipe, and a second portion which defines half of the desired bell configuration for the pipe. The mandrel has a second section which follows its leading cylindrical section and this following section has a configuration similar to that of the second portion of the mold halves when they are closed to mate together, but of an outside diameter less than the inside diameter of such second portion of the mold halves thereby to leave between the following cylindrical section of the mandrel and the second portion of the mold halves when closed together, spacing equal to the desired thickness of the wall of the finally belled pipe. Oridnarily such wall thickness will be identical with that of the unbelled portion of its pipe, but is could be either greater or less—depending entirely upon the spacing between the mandrel and mold cavity-defining walls and the compression force of the sleeve-like ram. In this connection both the following section of the mandrel and the second portion of the mold halves when closed extend beyond the end of the pipe thereby to leave an annular space between them. It is into this annular space that a sleeve-like ram moves, or pressure is otherwise applied, as, for example, through an annular air jet, axially about the following section of the mandrel to provide axial compression while the mold halves are maintained closed together under great compression.

In order that the mold halves may grip pipe ends of dimensional tolerance variations, resilient clamping means should be provided either within the mold blocks or adjacent thereto.

Means may be provided to pass cooling fluid through the mold halves and/or through the mandrel to effect rapid cooling of the thus compressedly bell-shaped end.

Preferably, however, the mandrel should be maintained at a temperature of about 240° F in order to avoid wrinkling of the pipe end during belling. Consequently, a heating fluid instead of a cooling fluid should be passed through the mandrel.

Following cooling of the belled pipe end through the mold block, the sleeve-like ram is first withdrawn axially back along the following section of the mandrel; the mandrel itself is withdrawn from the belled pipe end and then the two mold halves are separated; whereupon means are provided to eject the pipe from its belling station onto a carrier or other device or means for removing the pipe from the apparatus. Means are also provided to synchronize each of the above described operations of the apparatus to perform them in the proper order.

BRIEF DESCRIPTION OF THE DRAWINGS

In the accompanying drawings,

FIG. 5 is an enlarged section of the mandrel and mold blocks shown in the broken away portion of the left hand side of FIG. 1.

FIG. 6 is a section taken on the line 6—6 of FIG. 5 and looking in the direction of the arrows.

FIG. 7 is a partial section showing the mandrel inserted in a softened pipe-end in accordance with the present invention.

FIGS. 8, 9 and 10 illustrate, in reference to FIG. 7, the manner in which the belled portion of the pipe is shortened when subjected to axial compression in accordance with the present invention.

FIG. 11 is similar to FIG. 7 but illustrates a modification of the mandrel in the area adjacent the mold blocks.

DESCRIPTION OF THE PREFERRED EMBODIMENT

Figure 1:
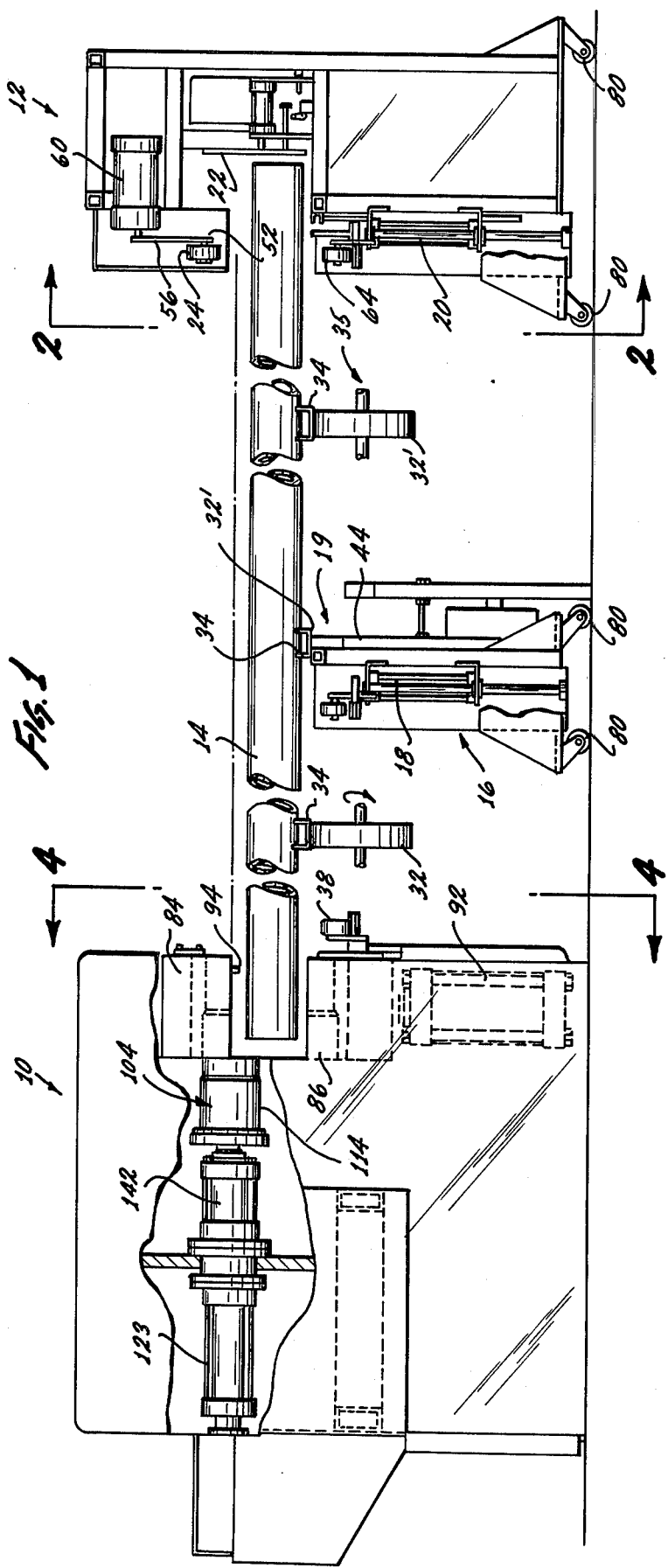
FIG. 1 is a side elevation partly broken away of the preferred embodiment of the apparatus of the present invention.

Referring to FIGS. 1 through 4 of the drawings, apparatus to accomplish the belling of thermo-plastic piping in accordance with the present invention may include a left-hand belling section designated generally by the number 10, and a right-hand pipe-end handling section designated 12. Intermediate these two sections, particularly where longer lengths of pipe 14 are to be belled, may be disposed an elevatable support and carrier unit 16 including an air cylinder 18. The right-hand section 12 may also include air-actuated means 20 similar to that 18 employed to accomplish the pipe elevation in the support unit 16, and an air-actuated pusher plate 22 and motor-driven roller means 24.

Figure 4:
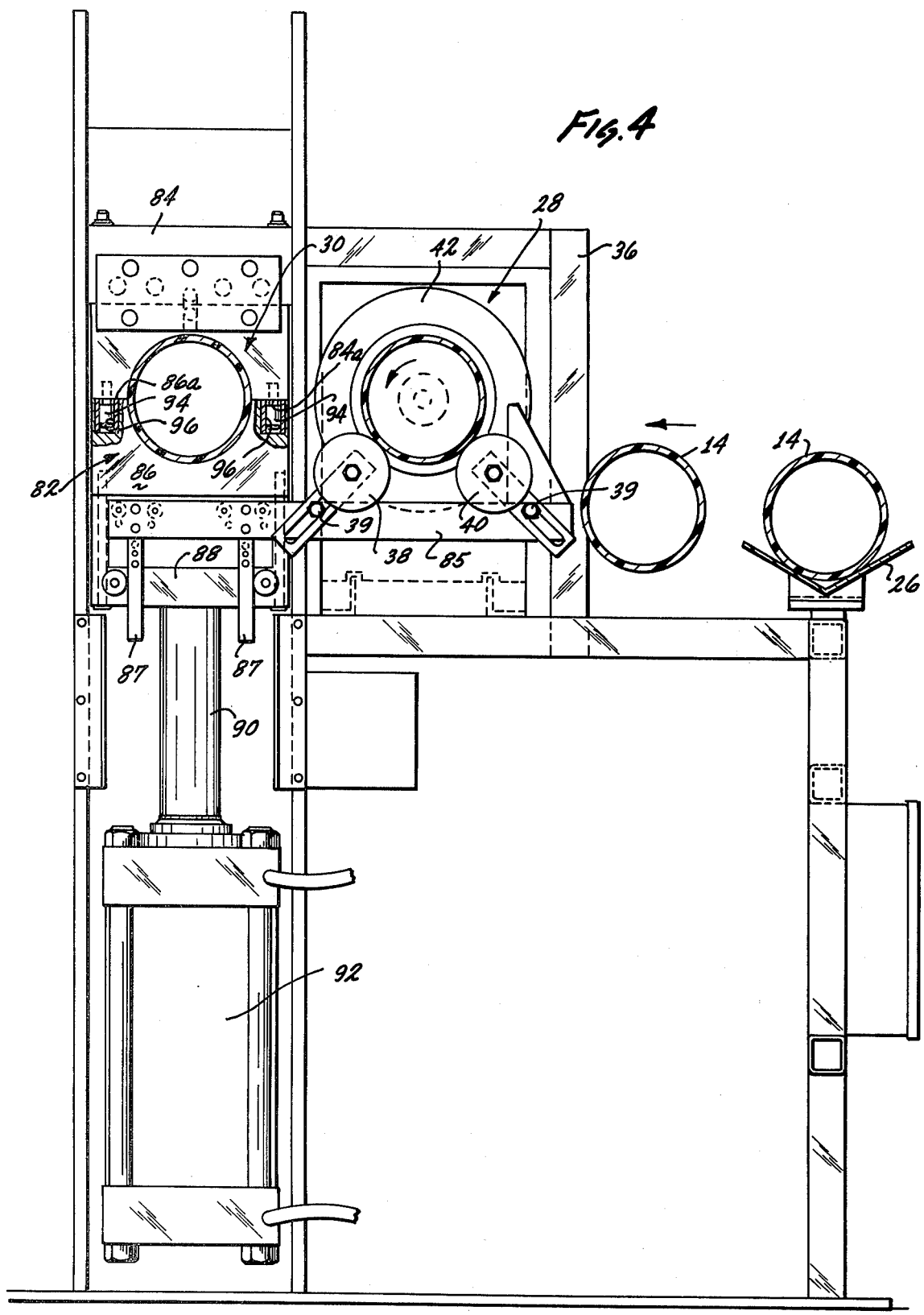
FIG. 4 is an enlarged section taken on the line 4—4 in FIG. 1 and looking in the direction of the arrows.

The left-hand section 10 as best seen in FIG. 4 includes a pipe-receiving trough 26, a heater station 28, and a belling station 30.

Conveyance of the pipe 14 after it is dumped by the trough 26 is accomplished by endless conveyors 32, 32' which are disposed, one between belling section 10 and carrier unit 16, and the other, between the latter unit 16 and end section 12 so as to carry the pipe transversely as it is driven incrementally from station 28 to station 30 by common shaft 35. Each of these conveyors 32, 32' has mounted thereon a plurality of receptacles 34 which move around the course of the endless conveyor 32 or 32', as shown in FIG. 2.

The heater station 28 includes a housing 36, a pair of adjustable roller elements 38 and 40, and a sleeve-like heater element 42 which is axially extendable and retractable with respect to the housing 36.

Figure 2:
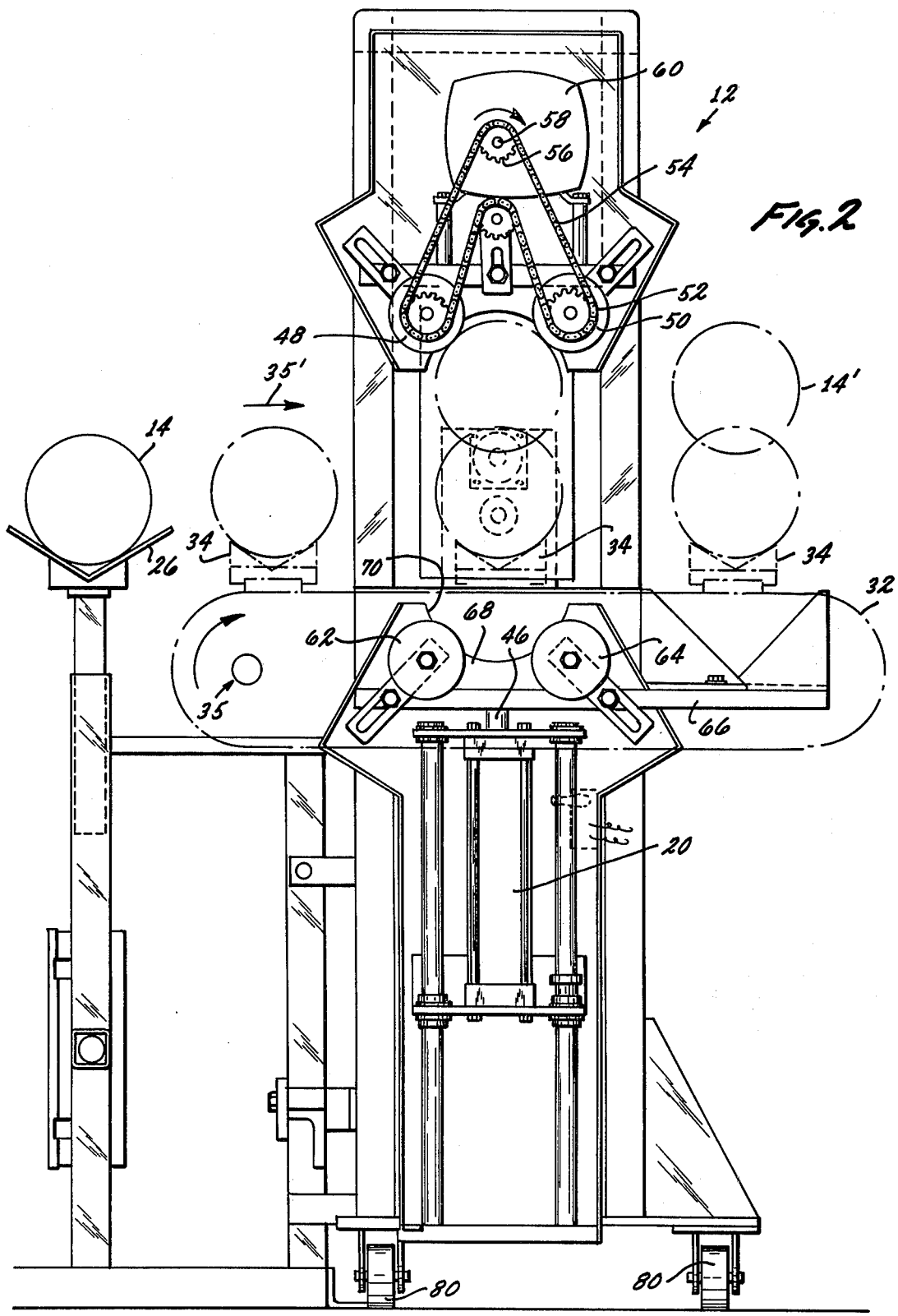
FIG. 2 is a section taken on the line 2—2 in FIG. 1 and looking in the direction of the arrows.
Figure 3:
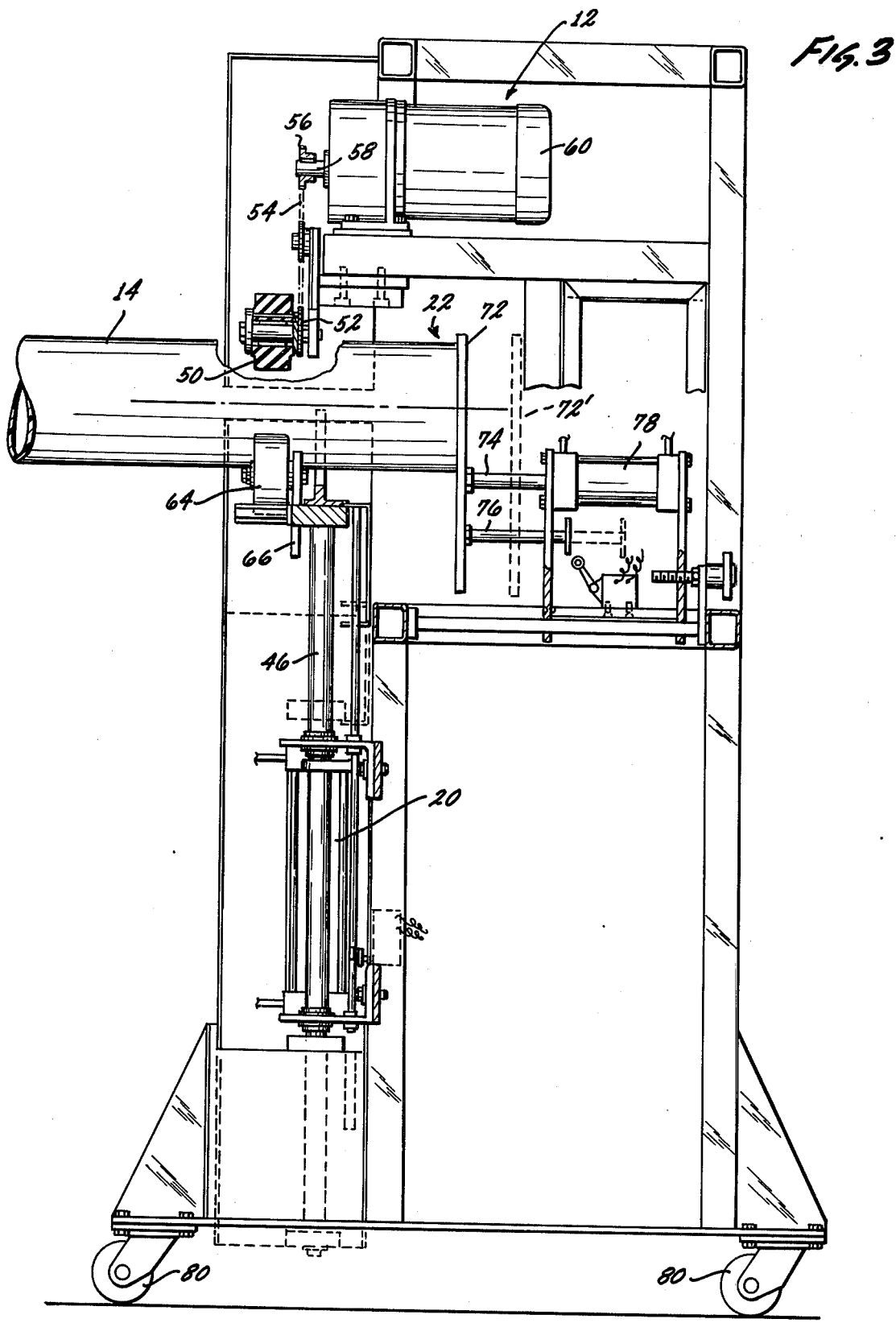
FIG. 3 is an enlarged elevation, partly in section, of the right hand side of the apparatus shown in FIG. 1.

As may be seen best in FIGS. 1 and 2, both the support unit 16 and the end-handling section 12 of the apparatus include elevatable pipe receptacles 44 and 46 operated by the air cylinders 18 and 20, respectively. The section 12 further includes a pair of adjustable positionable rollers 48 and 50 having sprocket and chain connections 52, 54, and 56 to the shaft 58 of a drive motor 60 (FIG. 2). An additional pair of adjustable positionable rollers 62, 64 are supported by a lift bar 66 which extends transversely of the upper portion of the elevatable receptacle 46. Extending above the lift bar 66 is a plate 68 having a semicircularly notched upper edge 70. In addition, as best seen in FIG. 3, an air-actuated pusher plate 72 is connected by a pair of shafts 74, 76 to an air cylinder 78. Desirably both the support unit 16, as well as the end section 12 of the apparatus may be provided with casters 80 in order to enable the apparatus to be employed to bell different lengths of plastic pipe 14.

The belling station 30, shown generally in FIG. 1, and in more detail in FIGS. 4 and 5 through 7, comprises what is essentially a hydraulic press 82, having an upper stationary block 84 and a lower, reciprocable press-block 86 mounted on the cap 88 of the hydraulic ram 90 operated by the hydraulic cylinder 92. A lifting bar 85 may also be mounted by members 87 on the hydraulic ram cap 88 to move upwardly and downwardly therewith. The adjustably positionable rollers 38, 40 for the heater station 28 may be mounted on the bar 85 by bolts 39.

The press blocks 84 and 86 are formed on their mating faces 84a and 86a with semi-cylindrical channels such that, when their two faces 84a and 86a are brought together, they define the outside configuration of the belled-end of a pipe of a particular type size. Since the present apparatus is designed to bell pipes of different diameters, the blocks 84 and 86 are removable from the press 82 for replacement by other blocks which define a larger or smaller belled pipe-end configuration.

Since the external dimensions of pipe of each particular diameter will ordinarily have tolerance variations, a recess 85 desirably may be provided in the faces 84a, 86a of the pipe entrance side of each block 84, 86 respectively to receive and hold a compressible semi-annular element 86 which protrudes radially inwardly past the block face 84a, 86a. This element 87 serves to grip and secure a pipe end 14a to prevent its withdrawal from the cavity 98 defined by the blocks 84, 86.

In order that the two blocks 84 and 86 may be brought together in perfect alignment to define the belled pipe-end, a pair of vertical alignment bosses 94 may be provided to extend perpendicularly downwardly from the face of the block 84 into receiving orifices 96 extending perpendicularly downwardly into the face 86a of the block 86.

As best seen in FIG. 5, the faces 84a and 86a of the replaceable portions of the blocks 84 and 86, respectively, are channeled to define, when brought together, a first substantially cylindrical cavity portion 98 which coincides with the outside diameter of the end 14a of the pipe being belled, and a second cavity portion 100 of the outside diameter and configuration of that portion of the end of the pipe in its desired belled configuration. This cavity portion 100 terminates in an opening 102 at the outer or left-hand sides of the blocks 84 and 86 as shown in FIG. 5. Desirably the walls 84a', 86a' defining at least the second cavity portion 100 may be slightly frusto-conical to provide some outward taper toward the opening 102. It is into this opening 102 that the belling mandrel 104 is insertable.

The belling mandrel 104 itself is comprised of a nose or leading end 106 having an outside diameter at least at its leading end 108 coinciding with the inside diameter of the pipe to be belled; and a following portion 110 which, with the frusto-concial step 112, connecting the leading end 106 with the following portion 110, defines the inside diameter and configuration of the pipe after belling is completed.

In addition, there is provided about the mandrel 104 an axially slidable sleeve 114, having an annular leading edge 116 of a frusto-conical configuration. The mandrel 104 desirably may be hollowed, as at 118, and provided with a plurality of passages 120 through which air under pressure, water or other fluid may be circulated in order to effect more rapid cooling of the pipe-end 14a after the mandrel 104 has been inserted into the heat-softened pipe-end under compression and such pipe end 14a has been forced out and molded into its desired bell-shaped configuration between the mandrel 104 and the walls 84a' and 86a' defining the cavity portions 98 and 100. The use of the fluid passages 120 need not necessarily be limited to cooling of the mandrel and thus of the plastic surrounding it, but may also serve to heat the mandrel portion 110 to some temperature well above ambient temperature. Such heating is desirable for achieving a more homogeneous flow of the heat-softened material within the cavity during the compression stroke of sleeve 116, thereby resulting in a more uniform quality of the finished bell than would be the case without controlling the temperature of the mandrel 104.

In addition, means may be provided first to drive the leading and following portions 106, 110 of the mandrel 104 axially into the opening 102 in the blocks 84 and 86, then to be followed by the driving axially of the sleeve 114 into the same opening in the manner hereinafter to be described.

Such driving means, in the embodiment of the invention shown in FIG. 5, comprises an annular piston 121 secured peripherally about a tubular stem 122 and slidable axially within a cylinder 123 formed by a sleeve 124 and closed by annular end members 125a and 125b. Stem 122 is threaded into a further tubular member 126 on the end of which is mounted the hollow mandrel 104 by means of a threaded capping member 128. Air passages 127a and 127b admit air into opposite ends of the cylinder 123.

The sleeve 114 is slidable axially relative to the mandrel 104 so that it may be advanced and retracted separately therefrom. Such advancement and retraction of the sleeve 114 may be accomplished by providing a force to act axially upon the outer sleeve 130 which has an end 132 threaded in, and secured to, an annular plate 134. A flange 136 which is welded or otherwise secured to the end of the sleeve 114 may be bolted by fasteners 138 to the plate 134. Reciprocation of the sleeve 130 may be accomplished by securing thereto an annular piston 140 in a generally cylindrical housing 142 comprised of a short sleeve 144 on each end of which is provided an annular member 146, 148. The member 146 may be permanently secured to an annular assembly which is passed through an opening 152 in a wall 154 to which the annular assembly may be secured as by bolts 156. The annular member 148 may be provided with an inner ring 158 within which the sleeve 130 may slide, and this inner ring 158 may be held in fixed engagement with the member 148 by a locking ring 160. Each of the annular members 146 and 148 defines an annular passage 162, 164 about the sleeve 130. Air passage means 166 extend through the member 146 for communication with the annular passage 162, and air passage means 168 extends through member 148 for corresponding communication with annular passage 164. The annular member 140, secured to the outside of the sleeve 130, occupies only a portion of the annular space 170 between the sleeve 144 and the sleeve 130 and is slidable reciprocally therein. Each of the passages 166 and 168 is alternatively connectable to a source of air or fluid under pressure not shown.

Further, the passage 120 within mandrel 104 is connectable by means of the externally located hose fitting 121a to a source of cooling fluid, not shown, which fluid may be passed through the core of the central tubes 122, 126, then directed radially outwardly through the passages 172 into the chamber 174 there performing the intended function of heating or cooling the external portions 106 and 110 of mandrel 104. From the chamber 174 the fluid passes through the axially extending passages 176 and the radial passages 178 for return through the annular space formed by bores 180 and 180a in tubes 126 and 122, and the outside of central tube 120. This annular return path terminates at externally located hose fitting 123. In addition to accepting the threaded adapter plug 121b for the water passage hose connections 121a, 123 the threaded portion of tubular stem 122 may also carry a stopnut 129a, a threaded block 129b and jam screw 129c. By positioning stopnut 129a towards or away from the annular end member 125a when stem 122 is in the retracted position, as indicated by $d_1$ and $d_2$, the stem 122 is caused to stop after a variable, predetermined distance of travel when the front face of stopnut 129a contacts the annular end member 125a. This causes the belling mandrel 104 to be stopped at any point within the adjustment range $D_1$ and $D_2$ at its leading edge corresponding to the adjustment range of $d_1$ to $d_2$ at the stopnut 129a. Thus, by simply rotating stopnut 129a for the desired distance, then locking it in that position by tightening jam bolt 129c against its flange, the maximum depth of travel of mandrel 104 into the die cavity 100 can be precisely controlled so as to permit variations in the distance between the tapered face 84b of the die and the leading edge 112 of the mandrel, indicated as $T_2$ and $T_1$. This control of die gap results in a corresponding control of wall thickness in that tapered transition portion of the pipe bell.

Further, indexing means, not shown, are provided to enable each of the several steps of the method, and the operation of the apparatus of the present invention to be accomplished in proper sequence, also as hereinafter to be described.

In operation, as a pipe 14 arrives in a trough 26 and is moved along the trough until it is parallel to the pipe 14 shown in FIG. 1, it will be dumped from the trough 26 into one of the pairs of co-aligned V-channel receptacles 34 affixed at precise spacing equal to the distance between stations 28 and 30 to the endless conveyors 32, 32'. Thereupon to be moved incrementally in the direction of the arrow 35' until the pipe reaches the central position shown in FIG. 2. At this point, the air cylinders 18 and 20 elevate the receptacles 44 and 46 to lift the pipe to an altitude at which it is placed in contact with the rollers 48 and 50, as well as with the lower rollers 62 and 64. Upon the arrival of the pipe 14 at its elevated position, shown as 14' in FIG. 2, the air cylinder 78 is operated to move the pusher plate 72 from its dotted line position 72' shown in FIG. 3, to its solid line position. Since the motor 60 may be continuously operated to drive the sprocket 56, the chain 54, and the sprockets 52 of the rollers 48 and 50, the pipe 14 in its elevated position 14' will be continuously rotated by the rollers 48 and 50. The heating element 42 at the opposite end 14a of the pipe may now be advanced to encompass that end, thereby to soften the same.

After a pre-determined period of softening, the heating element 42 may be retracted and the pipe 14 is shifted to the left in FIG. 4 for disposition in the space between the molding blocks 84 and 86 which, at this point, are separated from each other. Thereupon the block 86 is pressed upwardly into tightly forcible contact with the upper block 84 by action of the hydraulic cylinder 92 upon the ram 90 to tightly clamp the pipe-end 14a in the cavity portions 98, 100 defined by the channeled mating faces 84a, 86a of the blocks 84, 86 respectively. With the raising of the block 86, the bar 85 is also elevated to position the rollers 38, 40 properly to rotatably support the next arriving pipe 14 in alignment with the heater element 42 so that it may be advanced over its end 14' for heat-softening thereof.

As soon as the heat-softening pipe-end 14a is thus clamped under pressure between the blocks 84 and 86, air under pressure is admitted through passage 127a to act against annular piston 121 and thereby move the inner portions 106, 110 of the mandrel 104 axially into the opening 102 of the cavity portions 98, 100 in the blocks 84 and 86 through the sleeve 114 to assume the position within the thus-clamped pipe end 14a, as shown in FIG. 7. This provides the initial distension and molding of the heat-softened pipe end 14a outwardly to assume a belled-end configuration. Immediately following such advancement of the inner portions 106, 110 of the mandrel 104 into the opening 102, air or oil under pressure is admitted through the passage 166 into the annular passage 162 to force the annular piston 140 to the right in the space 170 (FIG. 5), and to carry with it the sleeve 130, the annular plate 134, the flange 136, and the sleeve 114. Thereby, the frusto-conical edge 116 of the sleeve 114 is advanced to the right in the opening 102 about the following portion 110 of the mandrel and against the heat-softened pipe end 14a to compact the same under pressure in the space between the outside wall of the mandrel portions 106 and 110 and the inside walls 84a', 86a' defining the second opening portion 100 in the block faces 84a, 86a. It is this compaction under high hydraulic and air pressure that results in an extremely accurate molding of the bell shaping for the pipe end 14a. As soon as the mandrel 104 with its sleeve 114 has been thus fully inserted in the opening 102 in the blocks 84 and 86, should it be desired to cool the belled pipe end 14a rapidly, air or other cooling fluid under pressure would be provided to enter the passage 120 through the nipple 121 for circulation through the mandrel portions 106 and 110 for ultimate discharge through the exit nipple 123. In this manner rapid cooling of the molded pipe-end 14a may be accomplished while the latter is still clamped between the blocks 84 and 86 and with the mandrel 104 and its sleeve 114 inserted into the opening 102 and into and against the heat-softened pipe end 14a. As previously pointed out, however, if, as is preferred, it is desired to maintain the mandrel in a heated condition (e.g. about 240° F), a hot fluid would be passed through the initial passage system of the mandrel 104. It should also be pointed out that whether the mandrel is to be heated or cooled, the flow of either the heating or cooling fluid may be either continuous or intermittent.

After a pre-determined period during which sufficient cooling of the pipe-end 14a occurs, a hydraulic valve (not shown) shifts as a result of the pre-programmed control circuit (also not shown) to trap the fluid in cylinder chamber 162, thus preventing sleeve 114 from retracting. Next, the air under pressure which has been admitted to the passage 127a is cut off and is shifted to the passage 127b, thereby driving the annular member 121 to retract stems 122, 126 and mandrel 104 from the die opening 102. During the cooling of the belled pipe end 14a, the plastic has shrunken tightly around mandrel 104, thus creating great friction between the inside wall of the belled pipe end 14a and the mating mandrel surface 106. This friction biases pipe 14 to move in the direction of retraction as the mandrel is withdrawn. Inasmuch as this friction can exceed the holding friction exerted by die clamps 84 and 86, the slipping of pipe 14 during mandrel retraction is prevented by maintaining sleeve 114 in position until the mandrel nose 106 is well clear of the belled pipe end 14a. Next, the hydraulic valve controlling the fluid is shifted to direct pressurized fluid into passage 168, thereby retracting compression sleeve 114 from die opening 102, following which the mold block 86 is pulled away from the mold block 84 by the hydraulic cylinder 92, and the belled pipe is lowered by the air cylinder 18, 20 from its elevated position 14" (FIG. 2) back down into a pair of receptacles 34 carried by the endless carriers 32 of the end section 12 and support unit 16 for discharge from the apparatus.

In the modification of the invention illustrated in FIG. 11, axial compression of the heat-softened pipe end 14a is accomplished by providing an annular air circuit 190 through which the leading and following portions 106, 110 of the mandrel 104 may slide coaxially. The edge 192 of the annular conduit 190 is slotted to permit air under pressure to pass out of that slotting 194 and into the opening 102 and space 102a between the following portion 110 of the mandrel and the inside walls 84a' and 86a' defining the second opening portion 110 and the block faces 84a and 86a respectively. Thereby, air under pressure from a source not shown which reaches the annular member 190 through the air line 196 will impact against the edge 14a' of the heat-softened pipe end 14a to provide the axial compression in a somewhat similar manner to that compression which is provided by the sleeve 114 in the embodiment of the invention illustrated in FIGS. 1 through 10 inclusive.

From the foregoing description of the method and apparatus of the present invention, it will be appreciated by those persons skilled in the art that the belling of plastic pipe may be accomplished most effectively and with great dimensional accuracy. Moreover, since the thinning of the wall of the pipe upon radially outward distension by the mandrel is compensated for by axial compression of the heat-softened pipe end in the space between the mandrel and the walls of the blocks defining the molding cavity, it is unnecessary for the walls of the pipe end to be pre-thickened upon extrusion of the pipe in accordance with certain prior art practices. Nor, in the absence of such thickening, is the pipe-end objectionably thinned so as to incur the risk of a blow-out where the belled pipe is used to convey a fluid under great pressure. In addition, since the molded configuration of the belled pipe-end may be formed with great accuracy, the dimensions of the annular recess between the spigot end of the pipe and where such end contacts the inner wall of the belled end of the pipe within which such spigot end is inserted, may be minimized.

The method and apparatus thus described offer many advantages in the belling of thermo-plastic pipe over the methods and apparatus of the prior art.

We claim:

1. An improvement in the method of belling plastic pipe wherein a section of pipe is conveyed to a first station in which at least one end of the pipe is subjected to heating to soften the pipe-end, said pipe-end having an annular edge wall, the pipe is then moved to a second station for insertion of a belling mandrel into the heat-softened end of the pipe, following which insertion the pipe-end is cooled and the inserted mandrel is withdrawn, said improvement comprising:
  a. Providing at said second station where the heat-softened pipe-end is disposed, a pair of mating mold halves spaced from each other, each of said mold halves defining a portion of a cavity, said cavity having (i) a first inner portion which coincides with the outside diameter of the plastic pipe as it arrives in the second station and is disposed inwardly of the softened pipe-end; and, (ii) a second portion with an inside diameter greater than the said outside diameter of the pipe-end and defining the outer configuration desired for the finally belled pipe-end; said second portion of the cavity extending from the first inner portion out beyond the softened pipe-end when in said second station; and bringing said mold halves together under great pressure about the softened pipe-end;
  b. Expanding said softened pipe-end into said mold cavity by inserting a mandrel axially into the softened pipe-end immediately after said mold halves have been brought together thereabout, said mandrel comprising a leading substantially cylindrical nose having an outside diameter just sufficiently smaller than the inside diameter of the pipe-end so as to be insertable therein; and a following section configured similar to said second portion of the mold cavity but externally dimensioned to provide between the walls of said following section and the inside walls of the cavity, spacing substantially equal to the thickness desired for the wall of the end of the pipe after it is belled;
  c. Axially compressing the expanded pipe-end by applying to the annular edge wall of the heat-softened pipe-end after said end has been expanded by the insertion of the mandrel into the pipe-end while disposed in said cavity defined by the mold halves, a pressure force axially aroung the mandrel;
  whereby, when said mold halves are so closed together under pressure about a heat-softened pipe and said mandrel is forced into the open end of the cavity defined by the mold halves, the leading nose of the mandrel will slide into the heat-softened pipe-end beyond the second portion of the mold cavity and into the first portion thereof, while the mandrel forces the heat-softened pipe-end outwardly to assume the configuration of the space between the said following section and the mold walls defining the second portion of the mold cavity; and the said pressure force applied axially against the edge wall of the expanded pipe-end, compresses the softened pipe-end axially in said space;

d. Cooling the pipe-end while said pipe-end is retained in the mold cavity and with the mandrel still inserted in the pipe-end and said axial compression is maintained; and, e. Thereafter terminating the application of the pressure force, withdrawing the mandrel, opening the mold halves, and removing the pipe with its thus-belled end.

2. An improvement in the method of belling plastic pipe wherein a section of pipe is conveyed to a first station in which at least one end of the pipe is subjected to heating to soften the pipe-end, said pipe-end having an annular edge wall, the pipe is then moved to a second station for insertion of a belling mandrel into the heat-softened end of the pipe, following which insertion the pipe-end is cooled and the inserted mandrel is withdrawn, said improvement comprising:

a. Providing at said second station where the heat-softened pipe-end is disposed, a pair of mating mold halves spaced from each other, each of said mold halved defining a portion of a cavity, said cavity having (i) a first inner portion which coincides with the outside diameter of the plastic pipe as it arrives in the second station and is disposed inwardly of the softened pipe-end; and, (ii) a second portion with an inside diameter greater than the said outside diameter of the pipe-end and defining the outer configuration desired for the finally belled pipe-end; said second portion of the cavity extending from the first inner portion out beyond the softened pipe-end when in said second station; and bringing said mold halves together under great pressure about the softened pipe-end;

b. Extending said softened pipe-end into said mold cavity by inserting a mandrel axially into the softened pipe-end immediately after said mold halves have been brought together thereabout, said mandrel comprising a leading substantially cylindrical nose having an outside diameter just sufficiently smaller than the inside diameter of the pipe-end so as to be insertable therein; and a following section configured similar to said second portion of the mold cavity but externally dimensioned to provide between the walls of said following section and the inside walls of the cavity, spacing substantially equal to the thickness desired for the wall of the end of the pipe after it is belled;

c. Axially compressing the expanded pipe-end by forcing a sleeve, slidable coaxially about the said following section of the mandrel, over the latter section and toward the leading cylindrical section of the mandrel, said sleeve presenting an annular edge face to the edge wall of the heat-softened expanded end and having an outside diameter just sufficiently less than the inside diameter of the portions of the molds defining the second portion of the cavity so as to be slidable into said second portion of the cavity when said mold halves are closed together under pressure;

whereby, when said mold halves are so closed together under pressure about a heat-softened pipe and said mandrel is forced into the open end of the cavity defined by the mold halves, the leading nose of the mandrel will slide into the heat-softened pipe-end beyond the second portion of the mold cavity and into the first portion thereof, while the following section of the mandrel forces the heat-softened pipe-end outwardly to assume the configuration of the space between the said following section and the mold walls defining the second portion of the mold cavity; and the said annular edge face of the sleeve, when the sleeve is forced axially against the end of the expanded pipe-end, compresses the softened pipe-end axially in said space;

d. Cooling the pipe-end while said pipe-end is retained in the mold cavity and with the mandrel still inserted in the pipe-end and said sleeve is providing axial compression; and, e. Thereafter retracting the sleeve, withdrawing the mandrel, opening the mold halves, and removing the pipe with its thus-belled end.

3. The improvement in the method of belling plastic pipe wherein a section of pipe is conveyed to a first station in which at least one end of the pipe is subjected to heating to soften the pipe-end and the pipe is then moved to a second station for the insertion into the pipe through the heat-softened end thereof, a belling mandrel, following which insertion the pipe-end is cooled, and then the mandrel is withdrawn from the pipe-end and the pipe is ejected from the second station, the improvement comprising, a. Bringing together about the heat-softened pipe-end after the pipe has been moved to its second station, a pair of mating mold halves, each of said mold halves defining one half of a cavity, said cavity having i. A first inner portion which coincides with the outside diameter of the plastic pipe as it is disposed in the second station and is disposed about the inner area of the softened pipe-end; and, ii. A second portion with an inside diameter greater than the outside diameter of the pipe-end and defining the desired outer configuration for the pipe-end after its belling, said second portion of the cavity extending from the first inner portion beyond the extremity of the softened pipe-end when disposed in said second station;

b. Forcing the heat-softened pipe-end radially outwardly against the walls of the mold halved defining said cavity by inserting axially into the heat-softened pipe-end a mandrel, said mandrel having an outside configuration similar to that of the mold walls defining the cavity but with dimensions sufficiently smaller to provide, when said mandrel is disposed within said mold cavity, a space between the mandrel and the mold walls of the desired thickness of the pipe-end after belling is completed;

c. Compressing the thus-expanded pipe-end axially within said mold halves through the open end thereof by moving a sleeve-like ram over the mandrel into said annular space between the mandrel and the mold walls and against the pipe-end;

d. Cooling the pipe-end while said pipe-end is retained in the mold cavity with the mandrel still inserted in the pipe-end and with the sleeve still providing axial compression; and, e. After sufficient cooling of the mandrel, first retracting the sleeve axially along the mandrel, then withdrawing the mandrel and opening the mold halves and removing the pipe with its thus-belled end.

4. Apparatus for compression molding an end of the thermo-plastic pipe to bell the same, said apparatus comprising:
   a. A heating area to heat-soften the end of the pipe;
   b. A belling station;
   c. Conveyor means to dispose the end of a pipe to be belled in said heating area and to retain said pipe-end in said heating area for a predetermined period to heat-soften said pipe-end and then to move the pipe transversely to its axis so that said heat-softened pipe-end is disposed in the belling station;
   d. A belling mandrel, said belling mandrel being co-axially aligned with, but, in its first position, spaced from the heat-softened end of said pipe, said mandrel being movable from its said first position to a second position wherein the mandrel is inserted in the heat-softened pipe-end, said mandrel having a leading substantially cylindrical nose with an outside diameter just sufficiently smaller than the inside diameter of the pipe so as to be insertable therein, and a following section configured to the desired internal configuration of the finally belled pipe-end;
   e. A pair of mating mold halves, said mold halves being disposed in transverse alignment with the heat-softened pipe-end when disposed in said belling station, and said mold halves being movable from a first position spaced from each other to a second position wherein said mold halves are tightly closed together about the heat-softened pipe-end, when in said belling station each of said mold halves defining one-half of a cavity, said cavity having
      i. A first inner portion which coincides with the outside diameter of the plastic pipe as it arrives in the belling station, and is disposed inwardly out of the softened pipe-end; and
      ii. A second portion with an inside diameter greater than the outside diameter of the pipe-end and defining the outer configuration desired for the finally belled pipe-end, said second portion of the cavity the outer configuration desired for the finally belled pipe-end, said second portion of the cavity extending from the first inner portion axially beyond the softened pipe-end when disposed in said belling station, the walls of the mold halves when so closed together defining said cavity and being spaced from the following section of the mandrel by the thickness of the walls desired for the pipe-end after belling.
   f. A compression sleeve, said sleeve having an inside diameter just sufficiently greater than the outside diameter of the following section of the mandrel as to be slidable thereover, and an outside diameter just sufficiently smaller than the inside diameter of the mold walls defining the second portion of the cavity as to be slidable therein, said sleeve having an annular end edge face, and said sleeve being slidable over said mandrel between a first position remote from the mandrel nose and a second position over the following section of the mandrel toward said mandrel nose to contact said transverse annular end wall of the pipe-end;
   g. Means to force said sleeve slidably axially over said mandrel after said mandrel has been inserted in said heat-softened pipe-end from the sleeve's first position to its second position to cause said annular end edge face to contact and compress the said annular end wall of the heat-softened pipe-end as it is disposed in the spacing between the walls of the mold halves defining said cavity and the following section of the mandrel, said means to force being disposed symmetrically about the axis;
   h. Means to cool the heat-softened pipe-end after said compression and mandrel insertion has occurred;
   i. Means to retract said sleeve back along said mandrel to its first position;
   j. Means to retract said mandrel back to its first position;
   k. Means to move said mold halves back to their respective first positions; and
   l. Means to eject the belled pipe from its disposition wherein its end is in said belling station.

5. The apparatus as described in claim 4 wherein means are provided to rotate the pipe during the predetermined period when its end is disposed and retained in the heating area.

6. The apparatus is described in claim 4 wherein the conveyor means comprises an endless conveyor having pipe receptacles moving transversely in a horizontal plane from a line which, when projected precedes the heating area, past the heating area and the belling station to a line which, when projected is beyond the belling station, said plane being below the heating area and the axis of the belling mandrel; and further means are provided in vertical alignment with both the heating area and the belling station first to elevate the pipe from the endless conveyor means to dispose its end to be belled in the heating area for a predetermined period, to lower the pipe after its said disposition in said heating area back down to the endless conveyor means for further conveyance to the belling station, and then to elevate the pipe again to axial alignment with the belling mandrel for belling, and finally to relower the pipe to said plane after belling has been accomplished, back to said endless conveyor.

7. The apparatus as described in claim 4 wherein the heating area includes a tubular heating element having an inside diameter greater than the outer diameter of the pipe-end to be heat-softened, the last said element being movable axially between a first position beyond the end of a pipe when disposed disposed in said heating area and a second position wherein said element co-axially surrounds that portion of the pipe-end which is to be heat-softened for subsequent belling.

8. The apparatus as described in claim 7 wherein pusher means are provided at the opposite end of the pipe from the end disposed in the heating area, said pusher means serving to push the pipe axially to dispose the last said pipe end further toward the heating element.

9. The apparatus as described in claim 4 wherein said mandrel is connected to a co-axial tubular element extending from the following section oppositely from the nose of the mandrel, said tubular element extending through a cylinder and having an annular piston secured to said tubular element and reciprocal in said cylinder in response to fluid pressure admitted to one end or the other of said cylinder, thereby to move said mandrel from its first position to its second position, or vice versa.

10. The apparatus as described in claim 9 wherein said compression sleeve is connected at its after end to an outer co-axial tubular element, said outer tubular element being disposed co-axially about the tubular element connected to the mandrel, said outer tubular element passing through a cylinder and having an annular piston secured to said outer element and reciprocable in said cylinder in response to fluid admitted to one side or the other of said piston, whereby said sleeve may be moved between its first and second positions.

11. The apparatus as described in claim 9 wherein the tubular element and the mandrel are provided with passages through which fluid under pressure may be conveyed into and out of said mandrel to effect cooling of the same and of any heat-softened pipe-end into which the mandrel may have been inserted.

12. The combination of
  a. A core element;
  b. A sleeve element fitting closely about said core element but slidably axially relative to said core element;
  c. Means to move each of said core element and said sleeve element reciprocably relative to each other, said means comprising:
    i. A first elongated member connected to, and co-axially extending from the core element in one direction;
    ii. A first housing co-axially surrounding a portion of said elongated member distally from the core element, said first housing having end walls each of which is orificed to encompass said first elongated member closely but slidably therethrough;
    iii. A first piston surrounding and secured to said first elongated member and reciprocable in said first housing, said first housing having means to admit pressure fluid to one or the other of its opposite ends, thereby to drive said first piston reciprocably in said first housing and to move with said first piston and said first elongated member and said core element;
    iv. An outer tubular member connected to said sleeve element and extending co-axially about a portion of the first elongated member in said one direction;
    v. A second housing axially spaced from the first housing, said second housing being intermediate the first housing and said sleeve element, said second housing surrounding co-axially said outer tubular member and having end walls each of which is orificed to encompass said outer tubular member closely but slidably therethrough;
    vi. A second piston reciprocable in said second housing and secured to said outer tubular member, said second housing also having means to admit pressure fluid alternatively to its opposite ends; thereby to drive said second piston reciprocably in said second housing and to move with said second piston, said outer tubular member and said sleeve; and
    vii. Stationary mounting means, said mounting means including means to hold fixedly in co-axial alignment both of said first and second housings.

13. The combination of
  a. A cylindrical core element;
  b. A co-axial cylindrical sleeve element surrounding said core element but slidably axially relative to said core element;
  c. Means to move each of said cylindrical element and said sleeve element reciprocably relative to each other, said means comprising:
    i. A first elongated cylindrical extension member connected co-axially to and extending from the core element in one direction;
    ii. A first cylinder co-axially surrounding a portion of said cylindrical extension member distally from the core element, said first cylinder having end walls each of which is orificed to encompass said first cylindrical extension member closely but slidably therethrough;
    iii. A first annular piston surrounding and secured to said cylindrical extension member and reciprocable in said first cylinder, said first cylinder having means to admit pressure fluid to one or the other of its opposite ends, thereby to drive said first annular piston reciprocably in said cylinder and to move with said first piston said first extension member and said core element;
    iv. An outer tubular member connected to said sleeve element and extending co-axially about a portion of the first elongated cylindrical extension member in said one direction;
    v. A second cylinder axially spaced from the first cylinder, said second cylinder being intermediate the first cylinder and said sleeve element, said second housing surrounding co-axially said outer tubular member, and having end walls each of which is orificed to encompass said outer tubular member closely but slidably therethrough;
    vi. A second annular piston reciprocable in said second cylinder and secured to said outer tubular member, said second cylinder also having means to admit pressure fluid alternatively to its opposite ends thereby to drive said second piston reciprocably in said second cylinder and to move with said second piston, said outer tubular member and said sleeve; and,
    vii. Stationary mounting means, said mounting means including means to hold fixedly in coaxial alignment both said first and second cylinders.

14. The combination as described in claim 13 wherein the cylindrical core element and first elongated cylindrical extension member are provided with passages through which fluid under pressure may be passed for cooling or heating of the core element and any annular body or element into which the core may be inserted.

15. The combination as described in claim 12 wherein activated stop means are provided adjustably to limit the distance said core element may be moved in a direction opposite the direction in which said first elongated member extends, said stop member being mounted on said first elongated member together with a screw element, said stop member being movable axially thereon with reference to said first housing by the turning of the screw element.

16. The apparatus as described in claim 1 wherein the inserted mandrel is maintained in a heated condition.

17. The apparatus as described in claim 4 wherein resilient clamping means are provided in association with the mold halves to prevent the pipe end, when closed about the mold halves, from being axially dislodged from the mold halves.

18. The apparatus as described in claim 17, wherein the wall of each mold half defining the first inner portion of the mold cavity is recessed, and a resilient clamping means is securely disposed therein.

* * * * *